United States Patent [19]

Kagetsu et al.

[11] 4,230,677

[45] Oct. 28, 1980

[54] RECOVERY OF $CR_2O_3$ FROM A CHROMIUM BEARING SOLUTION

[75] Inventors: Tadashi J. Kagetsu, Lewiston; William B. De Atley, Grand Island, both of N.Y.; Joseph S. Fox, Altamonte Springs, Fla.; Oreste J. Malacarne, Grand Junction, Colo.

[73] Assignee: Union Carbide Corporation, New York, N.Y.

[21] Appl. No.: 963,805

[22] Filed: Nov. 30, 1978

Related U.S. Application Data

[63] Continuation-in-part of Ser. No. 857,511, Dec. 5, 1977, abandoned.

[51] Int. Cl.³ ............................................ C01G 37/033
[52] U.S. Cl. ...................................... 423/54; 423/56; 423/58; 423/61; 423/127; 75/101 BE
[58] Field of Search .................. 423/54, 56, 58, 127; 75/101 BE, 121

[56] References Cited

U.S. PATENT DOCUMENTS

| | | | |
|---|---|---|---|
| 2,612,435 | 9/1952 | Perrin et al. | 423/58 |
| 2,839,359 | 6/1958 | Dunning | 432/58 |
| 3,137,541 | 6/1964 | Cooke | 423/58 |
| 3,819,800 | 6/1974 | Shaffer et al. | 423/58 |
| 3,856,916 | 12/1974 | Lafrancois et al. | 423/54 |
| 3,856,917 | 12/1974 | Texier et al. | 423/54 |
| 4,029,734 | 6/1977 | Stauter et al. | 423/54 |
| 4,040,860 | 8/1977 | Mansmann et al. | 423/607 |

FOREIGN PATENT DOCUMENTS

698700  11/1964  Canada ..................................... 423/54

Primary Examiner—Herbert T. Carter
Attorney, Agent, or Firm—Fred Ian Nathanson

[57] ABSTRACT

Method for the recovery of high purity $Cr_2O_3$ from a $Na_2CrO_4$ or $Na_2Cr_2O_7$ solution by producing $(NH_4)_2CrO_4$ by solvent extraction, evaporating the aqueous $(NH_4)_2CrO_4$ and igniting the resulting solids to provide high purity $Cr_2O_3$.

8 Claims, 1 Drawing Figure

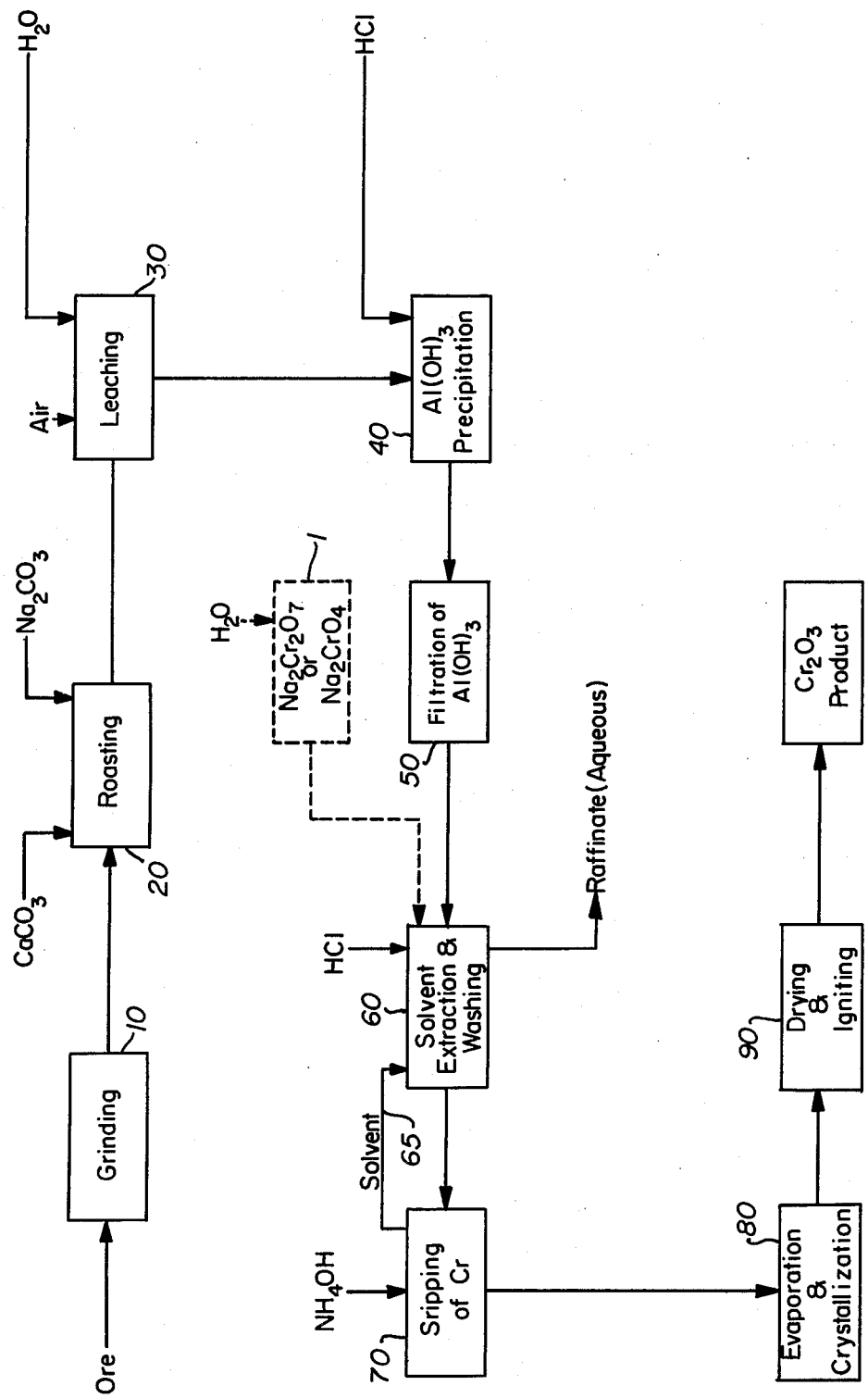

RECOVERY OF $Cr_2O_3$ FROM A CHROMIUM BEARING SOLUTION

This application is a continuation in part of our prior U.S. application Ser. No. 857,511, filing date Dec. 5, 1977 and now abandoned.

The present invention is directed to the processing of $Na_2Cr_2O_7$ or $Na_2CrO_4$ to produce a high purity $Cr_2O_3$. A particular embodiment of the present invention is directed to the processing of chromium ores to obtain high purity $Cr_2O_3$.

Chromium compounds are essential to the oil and gas industries for corrosion control and the preparation of catalysts, the food and beverage industries in refrigeration brines and cleansing compounds, the transportation industries in diesel locomotives and automobiles, the iron and steel industries in stainless steel metal and chromium plate, the aircraft industry for anodizing aluminum and pickling magnesium, the copper industry for descaling brass and stripping copper, the electrical industry in mercury-arc rectifiers and dry cells, the pyrotechnical industries in matches and fireworks, the photographic industry in lithography and engraving. However, the major product is chromic oxide or $Cr_2O_3$ which is used in metallurgy and as well as a pigment.

In the production of chromium metal from chromic oxide, a relatively pure grade of $Cr_2O_3$ is desired. When the $Cr_2O_3$ material contains significant amounts of sodium as an impurity, sodium vaporizes in the vacuum carbon reduction process of producing pure chromium. This sodium causes fire hazards when it is deposited on the equipment walls and later exposed to the atmosphere.

Also, it is important in many applications that a $Cr_2O_3$ product be essentially free of aluminum and sulfur impurities.

It is therefore an object of the present invention to provide a method for producing high purity $Cr_2O_3$ from $Na_2Cr_2O_7$ or $Na_2CrO_4$ or mixtures thereof.

It is a further object of the present invention to provide a method for producing high purity $Cr_2O_3$ from chromium ores.

Other objects will be apparent from the following description and claims taken in conjunction with the drawing which shows a flowsheet of a method in accordance with the present invention.

A method in accordance with the present invention comprises:

(i) providing an aqueous solution of $Na_2Cr_2O_7$ or $Na_2CrO_4$ or mixtures thereof;

(ii) adding an acid to the solution of step (i) to provide a pH of about 1 to 2;

(iii) contacting the acidified solution of step (ii) with an organic extractant to recover chromium values from the acidified solution in a chromium containing organic liquid phase;

(iv) mixing the chromium containing organic phase with a water solution of $NH_4OH$ to obtain an aqueous solution of $(NH_4)_2CrO_4$;

(v) subjecting the solution of $(NH_4)_2CrO_4$ to evaporation to provide a solid chromium bearing material;

(vi) igniting the solid chromium bearing material to obtain $Cr_2O_3$.

A particular embodiment of a method in accordance with the present invention as applied to chromium ores comprises:

(i) roasting in a gaseous oxidizing environment a mixture of chromium ore with $Na_2CO_3$ and $CaO$ at a temperature in the range of about 600° C. to 1100° C. for from about 0.5 to 6 hours, the amount of $Na_2CO_3$ being that which provides from about 1.4 to 4.2 pounds of $Na_2CO_3$ per pound of $Cr_2O_3$ in the ore and the amount of $CaO$ being that which provides from about 0.6 to 1 pound of $CaO$ per pound of $Cr_2O_3$ in the ore;

(ii) water leaching the roasted material obtained in step (i) at a temperature of from about 5° C. to the boiling point of water for from about 5 minutes to 5 hours;

(iii) adding an inorganic acid, e.g. HCl, $HNO_3$, $H_2SO_4$ to the leach liquor obtained in step (ii) to provide a pH of from about 3 to 9.5 to cause precipitation of aluminum impurities;

(iv) separating the precipitate from the leach liquor and thereafter adding an inorganic acid to the leach liquor to provide a pH of about 1 to 2;

(v) Contacting the acidified leach liquor obtained in step (iv) with an organic extractant to recover chromium values from the acidified leach liquor in a chromium containing organic liquid phase;

(vi) Mixing the chromium containing organic phase with a water solution of $NH_4OH$ to obtain an aqueous solution of $(NH_4)_2CrO_4$;

(vii) subjecting the solution of $(NH_4)_2CrO_4$ to evaporation to provide a solid chromium-bearing material;

(viii) igniting the solid chromium-bearing material to obtain $Cr_2O_3$.

In the practice of a particular embodiment the present invention, and with reference to the drawing, a natural chromium ore, e.g. Transvaal ore (30 to 50% $Cr_2O_3$, 15 to 25% Fe, 2 to 10% $SiO_2$, 10 to 15% Al, less than 1% Na, 6–15% MgO, 0.2–0.6% Ca) is particulated to a suitable size, e.g. 200 mesh Tyler series and finer as indicated at 10 and mixed with $Na_2CO_3$ and $CaO$ (the $CaO$ may be initially present as $CaCO_3$) and subjecting the mixture to roasting as indicated at 20.

The amount of $Na_2CO_3$ and $CaO$ can be varied in the roast between the limits of 1.4 and 4.2 pounds of $Na_2CO_3$ and 0.6 to 1.0 pounds of $CaO$ per pound of $Cr_2O_3$ in the ore.

The roasting temperature can be varied from 600° C. to 1100° C. and the roasting time can be varied from 0.5 hours to 6.0 hours. The preferred amounts of $Na_2CO_3$ and $CaO$ are 1.9 and 0.6 pounds, respectively. The preferred temperature and roasting time is 950° C. for 2 hours. The roasting is conducted in gaseous oxygen environment; by providing an excess of oxygen by passing, e.g. air, oxygen or a combustion gas with a sufficient excess of oxygen, over the roast bed.

The following equation is representative of the roast reaction using $Na_2CO_3$ to solubilize the chromium

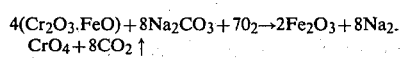

$$4(Cr_2O_3 \cdot FeO) + 8Na_2CO_3 + 7O_2 \rightarrow 2Fe_2O_3 + 8Na_2CrO_4 + 8CO_2 \uparrow$$

The calcines obtained from the roast are conventionally water leached as shown at 30 to substantially solubilize and remove the water soluble chromium salts from the calcines. The leaching can be carried out at temperatures from 5° C. to the boiling point and require a time from 5 minutes to 5 hours depending on the chromium concentration in the leach and the temperature. Bubbling air through the leach liquor increased the amount of chromium extracted from the calcines.

The leach liquor, in addition to the chromium values, contains aluminum and sodium as undesired impurities, e.g. as $NaAlO_2$. Aluminum impurities are removed, as shown at 40 and 50 by adding an acid to the leach liquor until the pH of the liquor is reduced to the range of 3 to 9.5 preferably 8.0. The amount of chromium coprecipitated with the $Al(OH)_3$ at a pH of 8 is typically about 0.6% of the total chromium content in the liquor. However, as the pH is reduced further the coprecipitation of chromium increases. Acids other than $H_2SO_4$, preferably HCl, should be used if a low sulfur product is desired.

The aluminum left in solution after the $Al(OH)_3$ is filtered off is typically less than 0.7% $Al_2O_3$ based on the weight of equivalent $Cr_2O_3$ in solution.

In order to remove the remaining impurities, e.g. Na impurities in the leach liquor obtained after the $Al(OH)_3$ precipitation step, a solvent extraction procedure is used as indicated at 60. This procedure consists of treating a dilute solution of leach liquor with acid (other than $H_2SO_4$ for low sulfur products) so that the final pH is in the range of 1 to 2, preferably 1.6 and the concentration of chromium as $Cr_2O_3$ is suitably in the range of 1 g/l to 25 g/l and preferably in the range of 5 g/l to 25 g/l with a particularly advantageous concentration being 8.2 g/l. The organic solvent can be either benzene, xylene or toluene alone or mixed with an isoparafinic hydrocarbon such as Isopar H produced by Exxon. The extractant is a tertiary amine such as Alamine 336 produced by General Mills. A 0.1 molar solution of the extractant in the solvent was employed; however, lower or higher concentrations of 0.02 to 0.3 molar can be employed. It has been found that with only 2 stages of extraction the organic phase can be loaded to 10 g/l of $Cr_2O_3$ and the aqueous phase (raffinate) reduced to only 0.04 g/l or 40 parts per million. No emulsions are formed and phase separations are rapid. The organic phase to aqueous phase ratio can be varied from 0.33 to 1.0.

The loaded organic phase is water washed to remove traces of aqueous leach liquor containing impurities of sodium and others. The number of stages of washing would depend on the type and efficiency of the washing step, however, no more than 1 or 2 stages of washing would ordinarily be required.

The chromium values in the loaded organic phase are stripped, as indicated at 70, by mixing with $NH_4OH$ solution at approximately 1.5 molar. The resulting phase separation is rapid (~1 minute). The aqueous phase contain $(NH_4)_2CrO_4$ and the stripped organic contained ~0.04 g/l $Cr_2O_3$. The ratio by volume of aqueous $NH_4OH$ to organic can range from 0.5 to 10. Thus, a relatively concentrated solution of $(NH_4)_2CrO_4$ can be obtained. The stripped organic can be recycled as indicated at 65.

The $(NH_4)_2CrO_4$ solution is evaporated to dryness as indicated at 80 and the resulting solid material is carefully ignited to $Cr_2O_3$ in a gaseous oxygen environment, e.g. air or oxygen, at about 500° C., after drying as indicated at 90. The solid material consists essentially of a mixture of $(NH_4)_2CrO_4$ and $(NH_4)_2Cr_2O_7$ i.e. ammonium chromate compounds.

The foregoing description commencing with the description of the solvent extraction procedure is applicable to the method of the present invention as applied to aqueous chromium-bearing solutions prepared by dissolving, for example, a commercial grade $Na_2Cr_2O_7$ or $Na_2CrO_4$ in water instead of obtaining an aqueous chromium-bearing solution of $Na_2CrO_4$ by ore leaching. With reference to the drawing, as shown at 1, a commercial grade $Na_2Cr_2O_7$ or $Na_2CrO_4$ or mixtures thereof is dissolved in water forming an aqueous solution having a concentration of chromium as $Cr_2O_3$ suitably in the range of 1 g/l to 25 g/l and preferably 5 g/l to 25 g/l. If required, this solution may be filtered to remove undissolved solids. Similar to the foregoing, a solvent extraction procedure as shown at 60 is applied to the aqueous solution with the remaining steps of the method of the present invention applied as hereinbefore described.

An example of the method of the present invention as applied to a $Na_2Cr_2O_7$ aqueous solution is as follows:

EXAMPLE I

One liter of an aqueous $Na_2Cr_2O_7$ solution was prepared by dissolving 11.5 grams of commercial grade $Na_2Cr_2O_7.2H_2O$ in water with 12 molar HCl being introduced into the solution so as to obtain a chromium concentration in solution based on $Cr_2O_3$ of 5.8 grams per liter at a pH of 1.6. The analysis of the $Na_2Cr_2O_7.2H_2O$ was as follows:

| Na | 15.38% | (by chemical analysis) |
|----|--------|------------------------|
| Cr | 34.63% | (by chemical analysis) |
| S  | 0.029% | (by chemical analysis) |
| Al | 0.008–0.08% | (by spect. analysis) |
| Ca | 0.001–0.01% | (by spect. analysis) |
| Mg | 0.001–0.01% | (by spect. analysis) |
| V  | 0.002–0.02% | (by spect. analysis) |

No other metallic elements were detected in the analysis.

A 0.1 M amine organic solution was prepared by dissolving 49 ml of Alamine 336 (tertiary amine) and 50 ml of isodecanol in benzene so that a total of 1 liter of organic solution was made. When 50 ml of the above aqueous solution and 50 ml organic were shaken it was found that emulsions formed.

However, when a tertiary amine was used with benzene or xylene or Aromatic 100 or 150 produced by Exxon or mixtures of these with an isoparafinic hydrocarbon such as Isopar H produced by Exxon without isodecanol no emulsion formed.

An example of this is as follows: When 50 ml of the above aqueous solution is mixed and shaken with 50 ml of a 0.1 M organic solvent consisting of 49 ml Alamine 336 (tertiary amine) dissolved in benzene to provide 1 liter of solution, no emulsions formed and separation of the phases is rapid (~1 min.).

The organic phase was water washed twice to remove traces of impurities.

The aqueous phase and washes were water white and contained negligible amounts of chromium. Less than 0.1% of the chromium in the organic phase was lost in the washes.

The organic phase (50 ml) contained 5.79 grams per liter $Cr_2O_3$ and the aqueous phase (50 ml) contained 0.02 grams per liter $Cr_2O_3$. Thus, using an organic to aqueous ratio of 1.0, greater than 99% of the chromium was extracted in a single stage extraction.

The 50 ml of loaded organic containing tertiary amine and benzene was stripped with 10 ml of 1.5 molar $NH_4OH$ using an organic to aqueous ratio of 5.0 and produced about 10 ml of strip liquor. The stripped organic was colorless and contained 0.04 grams per liter $Cr_2O_3$. No emulsions were observed.

The strip liquor was evaporated in a stainless steel dish and the resulting solids were ignited at 600° C. to $Cr_2O_3$. A typical analysis of the product $Cr_2O_3$ is:

| $Cr_2O_3$ | >99% | (by difference) |
|---|---|---|
| Al | 0.0004-0.04% | (by spect. analysis) |
| Ca | 0.008-0.08% | (by spect. analysis) |
| Mg | 0.002-0.02% | (by spect. analysis) |
| Na | 0.08-0.8% | (by spect. analysis) |
| Si | 0.008-0.08% | (by spect. anaylsis) |
| V | 0.001-0.01% | (by spect. analysis) |

Through the practice of the present invention a high purity (less than ~0.08-0.8% Na) $Cr_2O_3$ product can be obtained from $Na_2Cr_2O_7$ or $Na_2CrO_4$.

The method of the present invention may be practiced on solutions of commercial grade $Na_2Cr_2O_7$ or $Na_2CrO_4$ or mixtures of these two wherein the chromium concentration in solution based on $Cr_2O_3$ is suitably 1 to 25 grams per liter. If undissolved solids are present in the solution, the solution may be first filtered to remove them.

An example of the method of the present inventions as applied to chromium ore is as follows:

EXAMPLE II

Transvaal chromium ore having the analysis shown below in the amount of 5 lbs. was subjected to grinding to finer than 200 mesh.

| Chromium Ore Analysis (Oxides) (Chemical Analysis) | |
|---|---|
| $Cr_2O_3$ | 44.6% |
| Total $Fe_2O_3$ | 27.5% |
| $SiO_2$ | 3.5% |
| CaO | 0.4% |
| $Al_2O_3$ | 26.9% |
| $Na_2O$ | .1% |
| MgO | 10.1% |

100 g. of the ground ore was mixed with 25 grams of commercial grade CaO and 82.8 grams of powder reagent grade $Na_2CO_3$. The mixture was placed in a Inconel X dish and roasted at 950° C. for 2 hours with air being forced over the mixture. After roasting, the calcined mixture was leached with 2 ml. of water per gram of calcine and then water washed with 2 ml. of water per gram of calcine to provide leach liquor and wash combined having the following analysis:

| $Cr_2O_3$ | 22.3 g/liter | (by chem. anal.) |
|---|---|---|
| Al | 0.1-1 g/liter | (by spect. anal.) |
| Ga | 0.004-0.04 g/liter | (by spect. anal.) |
| Mg | 0.0004-0.004g/liter | (by spect. anal.) |
| Na | >20 g/liter | (by spect. anal.) |
| Si | 0.004-0.04 g/liter | (by spect. anal.) |

12 molar HCl was introduced into the leach liquor to reduce the pH from 12.8 to 8.0 with resultant precipitation of aluminum as $Al(OH)_3$. After removal of the precipitate by filtration the acidified leach liquor had the following analysis:

| $Cr_2O_3$ | 22.3 | g/liter |
|---|---|---|
| Al | 0.13 | g/liter |
| Na | >20 | g/liter |

Solvent extraction feed solution having a concentration of 5.8 g/l $Cr_2O_3$ was prepared by mixing 520 ml of concentrated leach liquor (pH 12.8) with 265 ml of 12 molar HCl and $H_2O$ to produce 2000 ml of solution having a pH of 1.6.

An organic solution was prepared by mixing isodecanol (5% by volume), Isopar H, and Alamine 336 (0.1 m) to form 2000 ml. of organic solution as suggested by General Mills Chemical Division Chromium-Liquid Ion Exchange, Bulletin CSDI-61. When 150 ml. of the above aqueous and 150 ml. of organic were shaken, emulsions formed and the organic turned brown.

When the isodecanol was omitted, emulsions still formed, but the organic phase was not brown but orange in color suggesting the previous discoloration was due to degradation of the alcohol.

When the tertiary amine was used with benzene or xylene or various aromatic diluents from Exxon, without isodecanol, no emulsion formed. An example of this is as follows: When 100 ml of the above aqueous was mixed with 100 ml of the organic solvent of the tertiary amine in either benzene or xylene or Aramatic 100 or 150, no emulsion formed and separation of the phases was rapid (~1 minute). The organic phase was water washed three times to remove impurities. The aqueous washes were water white and contained negligible amounts of chromium. The amine did not degrade.

The organic phase contained 5.79 g/l $Cr_2O_3$ and the aqueous phase contained 0.019 g/l $Cr_2O_3$.

100 ml of the loaded organic containing tertiary amine and benzene was stripped with 20 ml of 1.5 molar $NH_4OH$ and produced about 20 ml of strip liquor which after evaporation and ignition of the resulting solids at 600° C. had the following analysis:

| $Cr_2O_3$ | >99% | (by difference) |
|---|---|---|
| Al | .08-.8% | (by spect. analysis) |
| Ca | 0.008-0.08% | (by spect. analysis) |
| Mg | 0.0004-0.004% | (by spect. analysis) |
| Na | 0.04-0.4% | (by spect. analysis) |
| Si | 0.004-0.04% | (by spect. analysis) |
| V | 0.004-0.04% | (by spect. analysis) |

If emulsions form on a large scale extraction plant, the process would not be practical, thus the choice of the proper diluents or combinations of the diluents for the amine is extremely important.

The recovery of chromium was over 99% in the extraction step.

In the practice of the present invention a roasting temperature of 950° C. led to 94% extraction of the chromium from the calcines, when air was bubbled into the leach liquor during the leaching step. Without air during leaching comparable conditions resulted in only 88% extraction. Also, the ranges for the amounts of $Na_2CO_3$ and CaO are important for economic reasons; 94% extraction was obtained with 25 g. CaO and 82.8 g. $Na_2CO_3$ per 100 g. chrome ore containing 44.6% $Cr_2O_3$. The use of larger amounts 50 g. CaO and 82.8 g. $Na_2CO_3$ lowered the extraction from 88% to 83% when air was not used in the leaching step. The CaO may be added as lime or limestone.

In the calcine leaching step the pH of ~12 is adequate. The pH range of 3 to 9.5 in the aluminum precipitation step is important, with an optimum pH at 8.0. At higher pH values more chromium is lost in the $Al(OH)_3$ ppt. and more chromium is lost at the lower pH range by dissolution of the chrome hydrate.

Through the practice of the present invention a high purity $Cr_2O_3$ product, less than ~0.2% Al and less than ~0.04–0.4% Na, can be obtained from natural chromium ores such as Transvaal ore and other oxidic chromium bearing materials.

In the practice of the present invention, the choice of the proper diluents or combinations of the diluents for the amine is extremely important since if emulsions form in a large scale extraction plant the process would not be practical.

The particular organic solvents used in the present invention are essential for the prevention of emulsions. Benzene, xylene, Aramatic 100 or 150 produced by Exxon or mixtures of the above or a mixture of one of the above with an isoparafinic hydrocarbon (such as Isopar H produced by Exxon) where found satisfactory.

It was found that the use of isodecanol as a solvent extraction modifier was undesirable due to its reaction with the chromium in the solution which reaction causes the alcohol to break down and contribute to emulsion formation.

In addition, by the practice of the present invention, an essentially sulfur-free product can be obtained due to the fact that inorganic acids other then $H_2SO_4$ can be readily used in the practice of the invention and further that the solvent extraction purification step removes substantially all sulfur contamination which may be due to the use of $H_2SO_4$ or which may be introduced as an impurity with the materials involved in the process. HCl would be a preferred acid to use in the practice of the present invention if a sulfur-free product is desired.

What is claimed is:

1. A method for recovering high purity $Cr_2O_3$ from chromium ore which comprises:
   (i) roasting in a gaseous oxidizing environment a mixture of chromium ore with $Na_2CO_3$ and CaO at a temperature in the range of about 600° C. to 1100° C. for from about 0.5 to 6 hours, the amount of $Na_2CO_3$ being that which provides from about 1.4 to 4.2 pounds of $Na_2CO_3$ per pound of $Cr_2O_3$ in the ore and the amount of CaO being that which provides from about 0.6 to 1 pound of CaO per pound of $Cr_2O_3$ in the ore;
   (ii) water leaching roasted material obtained in step (i) at a temperature of from about 5° C. to the boiling point of water for from about 5 minutes to 5 hours;
   (iii) adding acid to the leach liquor obtained in step (ii) to provide a pH of from about 3 to 9.5 to cause precipitation of aluminum impurities and separating said impurities from the leach liquor;
   (iv) adding acid to the leach liquor to provide a pH of about 1 to 2;
   (v) contacting the acidified leach liquor obtained in step (iv) with a tertiary amine dissolved in an organic solvent essentially free of isodecanol to inhibit the formation of emulsion, to recover chromium values from the acidified leach liquor in a chromium containing organic liquid phase;
   (vi) treating the chromium containing organic phase with a water solution of $NH_4OH$ to obtain a solution of $(NH_4)_2CrO_4$;
   (vii) subjecting the solution of $(NH_4)_2CrO_4$ to evaporation to provide a solid chromium-bearing material; and
   (viii) igniting the solid chromium-bearing material to obtain $Cr_2O_3$.

2. A method in accordance with claim 1 wherein the roasting temperature of step (i) is about 950° C. and the roasting time is about 2 hours.

3. A method in accordance with claim 1 wherein an aggregate of about 1.9 pounds of $Na_2CO_3$ and 0.6 pound of CaO are used per pound of $Cr_2O_3$ in the ore.

4. A method in accordance with claim 1 wherein the pH provided in step (iii) is about 8.

5. A method in accordance with claim 1 wherein the pH provided in step (iv) is about 1.6.

6. A method in accordance with the claim 1 wherein the acid used in steps (iii) and (iv) is an inorganic acid which does not contain sulfur when a low sulfur product is desired.

7. A method in accordance with claim 1 wherein acid used in steps (iii) and (iv) is HCl.

8. A method in accordance with claim 1 wherein in step (ii) air is bubbled through the water leaching liquid during the leaching step to increase the recovery of chromium values.

* * * * *

UNITED STATES PATENT AND TRADEMARK OFFICE
CERTIFICATE OF CORRECTION

PATENT NO. : 4,230,677
DATED : October 28, 1980
INVENTOR(S) : Tadashi J. Kagetsu, et al.

It is certified that error appears in the above—identified patent and that said Letters Patent is hereby corrected as shown below:

Column 7, line 17 "where" should read "were".

Signed and Sealed this

Seventeenth Day of February 1981

[SEAL]

Attest:

Attesting Officer

RENE D. TEGTMEYER
Acting Commissioner of Patents and Trademarks